United States Patent [19]

Kolber

[11] 4,103,289

[45] Jul. 25, 1978

[54] CALCULATOR THEFT PREVENTION DEVICE

[76] Inventor: Steven Kolber, 59 Hillside Ter., Wayne, N.J. 07470

[21] Appl. No.: 680,899

[22] Filed: Apr. 27, 1976

[51] Int. Cl.² .................. G08B 13/06; H04Q 1/00
[52] U.S. Cl. .................. 340/164 R; 340/149 A; 340/365 E; 340/571
[58] Field of Search ........... 340/164 R, 149 A, 274 C, 340/365 E; 317/134; 361/171, 172

[56] References Cited

U.S. PATENT DOCUMENTS

| 3,633,167 | 1/1972 | Hedin | 340/164 R |
| 3,781,804 | 12/1973 | Lederer | 340/164 R |
| 3,839,710 | 10/1974 | Rogers | 340/274 C |
| 3,940,738 | 2/1976 | Teeters | 317/134 |

Primary Examiner—Harold I. Pitts
Attorney, Agent, or Firm—Eliot S. Gerber

[57] ABSTRACT

A security device for an electronic calculator consists of an electronic circuit within the calculator which permits operation of the calculator only after the operator has correctly operated a predetermined sequence of keys. The circuit is connected to the sense and the digit drive lines of an electronic calculator having an electronically scanned keyboard. The circuit includes a key selection matrix, a valid actuation discriminator logic, an actuation sequence counter, an alarm inhibiter and an alarm which disables the proper functioning of the calculator.

8 Claims, 4 Drawing Figures

CALCULATOR THEFT PREVENTION DEVICE

BACKGROUND OF THE INVENTION

At the present time electronic calculators are used for a multiplicity of purposes by engineers, accountants, students and others. The price of such electronic calculators varies widely, depending upon the complexity of their functions, the number of functions they perform, whether they provide a print-out, the number of digits which they display, and other factors. For example, small hand-held calculators would include calculators which simply add, subtract, multiply and divide and display only six digits, which may cost as little as $25.00, to calculators costing many hundreds of dollars which perform engineering functions or provide a tape print-out.

There have been various suggestions as to how electronic calculators may be secured against theft or loss by being borrowed and not returned. It has been suggested that the calculator may be permanently fitted into a casing, which casing is securely fastened to a desk or other piece of furniture. Of course, such security provision prevents the portability of the calculator. It has also been suggested that the casing may be made removable and lockable. When the calculator is to be moved, the lock must be unlocked by a key or a combination and the calculator removed from the casing.

These provisions against theft have proven to be cumbersome and inefficient. For example, an engineer, during his travels within a plant, may move from one location to another and frequently wishes to have his hand-held calculator with him. He may, during the day, put it down temporarily in any number of locations. As long as the calculator is unlocked from its casing, it is subject to theft or being borrowed and not returned.

A similar problem may arise in connection with computer terminals, electric typewriters and other electric keyboard instruments such as the computer terminal of the alphanumeric type. In these instruments some provision may be desired to prevent theft of the instrument or to prevent unauthorized use of the instrument, for example, unauthorized use of the computer terminal. The conventional method used for such security is to chain, or otherwise lock, the terminal with its cover closed or to chain or otherwise lock the instrument to a piece of furniture. These measures are subject to the faults of a conventional lock, namely, the locks may be picked, the keys lost, and the unlocking of the device may be time-consuming and cumbersome.

SUMMARY OF THE INVENTION

In accordance with the present invention an electronic circuit is provided within a calculator or other keyboard instrument. The circuit provides a means to prevent unauthorized persons from effectively using the calculator or other electronic instrument. After the power is switched on, the user of the calculator must depress, in proper sequence, a preselected number of keys. For example, he must depress the keys 4, 6, "add" and 0, in that exact sequence. The calculator will properly function only if the proper sequence of keys is depressed, and no other keys are depressed at the same time along with the proper keys. Preferably the malfunctioning of the calculator is provided by the circuit of the present invention and the preferred malfunction is to repeatedly clear the calculator's registers, i.e., as if the "clear" key were to be repeatedly pressed. That is, if the unlocking sequence of keys is not correctly keyed by the user, the registers will be repeatedly cleared so that calculations will not be performed.

The basic hand-held calculator consists of one or more large-scale integrated chips (LSIC) for performing the calculations, a keyboard, a display, a display interface circuit, and a power supply. The circuit of the present invention has electrical connections to the sense lines between the keyboard and the calculator chip and also to the digit drive lines between the calculator chip and the display drive. In the ordinary case there need be only, for example, three connections made to the sense lines and 10 connections to the digit drive lines, assuming that it is a 10-digit display calculator. The circuitry of the present invention is preferably produced as a large-scale integrated circuit and uses state-of-the-art techniques, that is, there is no requirement for advances in the technology of production of the circuit in order to make it feasible. Alternatively, the entire circuit of the present invention may be incorporated as part of the large-scale integrated chip.

It is a feature of the present invention to provide a security device for a keyboard electronic instrument, in which instrument the keyboard has a plurality of cross-points and a plurality of sense lines and a plurality of digit lines connected thereto. The instrument has scanning means to interrogate the cross-points of its keyboard. The security device of the present invention is connected to at least some of the digit lines and all of the sense lines. The security device includes a selection matrix connected to a sense line and a digit line; a valid actuation discrimination means connected to the key identity means; a key sequence counter means connected to the selection and validity means to provide a sequence of pulses corresponding to the sequencing of the keys of said keyboard; and alarm means which is actuated unless inhibited by said validity means, the alarm means producing pseudo key actuation, such as "clear", to cause malfunction of said instrument.

It is an objective of the present invention to provide a security device for a keyboard instrument, which security device depends upon a code which is a sequence of keys, which code is not easily broken by unauthorized persons.

It is a further objective of the present invention to provide a security device for keyboard instruments, which security device will prevent the instrument from properly functioning unless the user first operates the keys of the keyboard in a preselected code in proper sequence.

It is a further objective of the present invention to provide an inexpensive integrated circuit component which may be added to existing electronic calculators as an anti-theft measure and in which the fitting of the component onto the calculator may be performed simply and without damaging the calculator components.

It is a further objective of the present invention to provide a circuit which may be formed on the same semi-conductor chip as the calculator circuit and thereby may be relatively simply and inexpensively incorporated within an electronic calculator to provide security against theft or unauthorized use.

It is a further objective of the present invention to provide a device to prevent unauthorized use of an electronic calculator in which the manufacturer may readily and inexpensively select the code and sequence which corresponds to the depression of keys on the keyboard required of the user before proper operation of the calculator is obtained.

Other objectives of the present invention will be apparent from the following detailed description providing the inventor's best mode of performing the invention.

DETAILED DESCRIPTION

The circuitry of the present invention is intended to be formed on a semi-conductor chip using conventional technology applicable to large-scale integrated circuits. Such technology, as is presently well-known in the art, may form a large number of active electronic components and logic elements on a single semi-conductive chip at relatively low cost for each element. For example, it is well known to form tens and even hundreds of logic gates on a single chip at a cost, for example, of less than 1/10 of a cent for each gate.

The circuitry of the present invention is intended to be compatible in its power demands and in its impedance inputs and outputs with the semi-conductive chips used in a variety of electronic calculators. One example of such compatibility is that the device of the present invention may be utilized with the series of electronic calculators manufactured by Texas Instruments and based on the TMS 0100 NC which is an MOS/LSI (metal oxide semiconductor large scale integrated) chip. The variations in the calculators produced from the single chip are obtained by single-level gate mask programming. This particular Texas Instrument chip uses an external clock whose normal frequency is 250 KHZ in which a digit time is equivalent to 39 clock cycles or 156 microseconds. The digits are displayed in a scanning mode, that is, they are displayed for one D-time (digit time) and displayed again one D cycle (11 D times) later, that is, 1.72 milliseconds. This particular calculator chip from Texas Instruments, used with the device of the present invention, utilizes a scanning technique of the keyboard. This scanning technique permits the keyboard to be a simple switch matrix.

Other manufacturers produce competitive types of calculator chips, some of which provide an internal clock. Examples of such other calculator chips which also utilize a scanning technique for the keyboard which technique is utilized in the device of the present invention are produced by National Semiconductor, Rockwell International and Hewlett-Packard.

Figure 1:
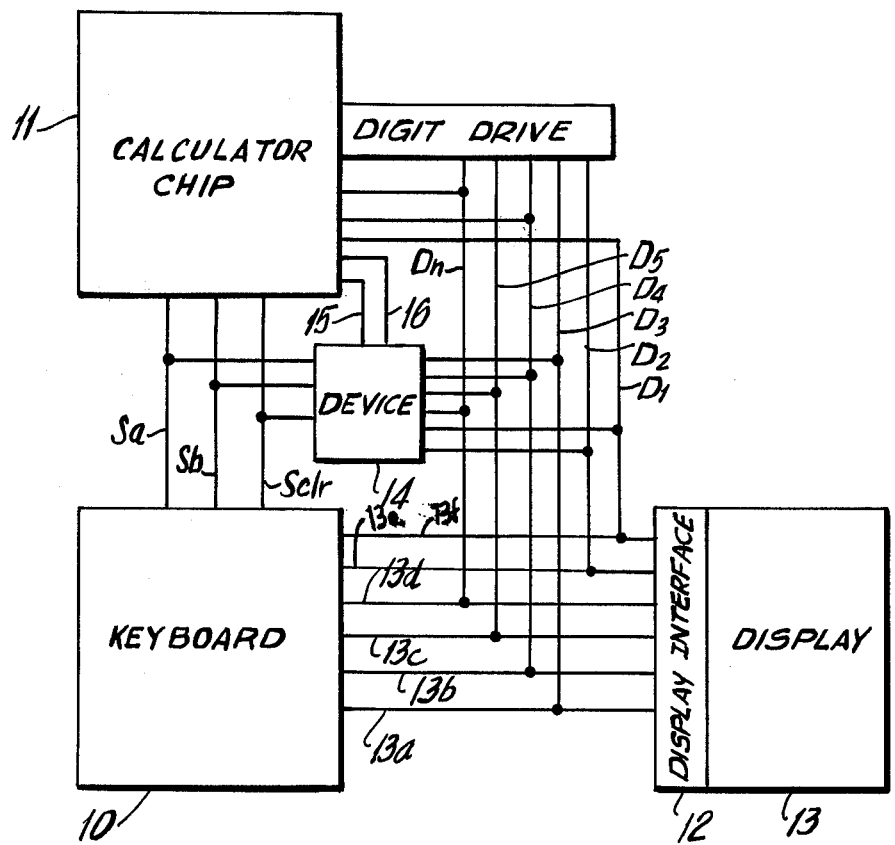
FIG. 1 is a block schematic diagram showing a general schematic of the connection of the device of the present invention in a conventional electronic calculator.

As shown in FIG. 1, the generalized calculator consists of a keyboard 10, a calculator chip 11 connected to the keyboard by the sense lines $Sa$, $Sb$ and SCLR (the sense line connected to the "clear" key). A display interface circuit 12 is connected to the keyboard by lines 13a through 13f and is also connected to the calculator chip by the drive lines D1 through D$n$. In FIG. 1 six digit drive lines are shown corresponding to a six-digit display, for the purpose of simplicity of illustration. However, the number of digit drive lines depends on the number of digits to be displayed, so that in an eight-digit display there will be eight digit drive lines and in a 10-digit display there will be 10 digit drive lines, etc. The display interface 12 is connected to the display 13. However, the display may be driven directly, over digit drive lines, from the calculator as in the C-595 of General Instruments Co. A power supply (not shown) is connected to the circuitry shown in FIG. 1 and may either be a battery or an A.C. supply, and a case (not shown) surrounds the circuit shown in FIG. 1 and has an opening or glass through which the display 13 may be seen. The types of displays 13 which are generally used include Nixie tubes, a trademark of Burroughs Corporation, gas discharge tubes, fluorescent tubes, light emitting diodes and liquid crystal displays. The various types of keyboards are used depending upon the cost and usage factors such as capacitor keyboard, magnetic reed keyboards and physical button switch keyboards which operate by bringing together two conductors.

The device of the present invention 14 is shown as being connected to the sense lines $Sa$, $Sb$, S CLR (to all the sense lines, where there may be two through eight sense lines) and also being connected to the digit drive lines D1 through D$n$ and also being connected for purposes of power to the calculator chip 11 through lines 15 and 16. All of its flip-flops are cleared (reset) when the power switch is turned on.

The keyboard provides a matrix, that is, a plurality of possible cross-points. In the typical keyboard the matrix provides an x-y grid so that every time a key is closed an X line is connected to a Y line. As shown in FIG. 1 there are three sense lines and six digit lines which cross in 18 possible cross-points. There are various schemes in which the keyboard is scanned, i.e., strobed, so that the calculator chip knows which key is being depressed.

In a typical scanning system the key switch's contacts, i.e., cross-points, are repeatedly scanned. The scanning rate is very high compared to the closure time of the switch contacts. In some scanning systems, when a closure is detected, a code defining the closed key may be used to address a memory, for example, a MOS ROM (metal oxide semi-conductor read only memory) whose output is the desired code. One type of keyboard scanning system is described in U.S. Pat. No. 3,715,746 to Hatano and another in U.S. Pat. No. 3,662,378 to MacArthur. In some scanning systems shift keys are used to enable each key to perform two or more functions.

In Hall Effect and other types of special non-contact keyboards the device of the present invention may follow the signal conditioning circuitry. Suitable integrated circuits for keyboard encoding are National Semiconductor MM 5740 and MOS Technology Inc. MCS 1007. One scanning system utilizing a capacitive switch is described in the article "Matrix Scanning Logic for Capacitive Switching Keyboard", *Computer Design*, January 1973, at page 84.

Figure 3:
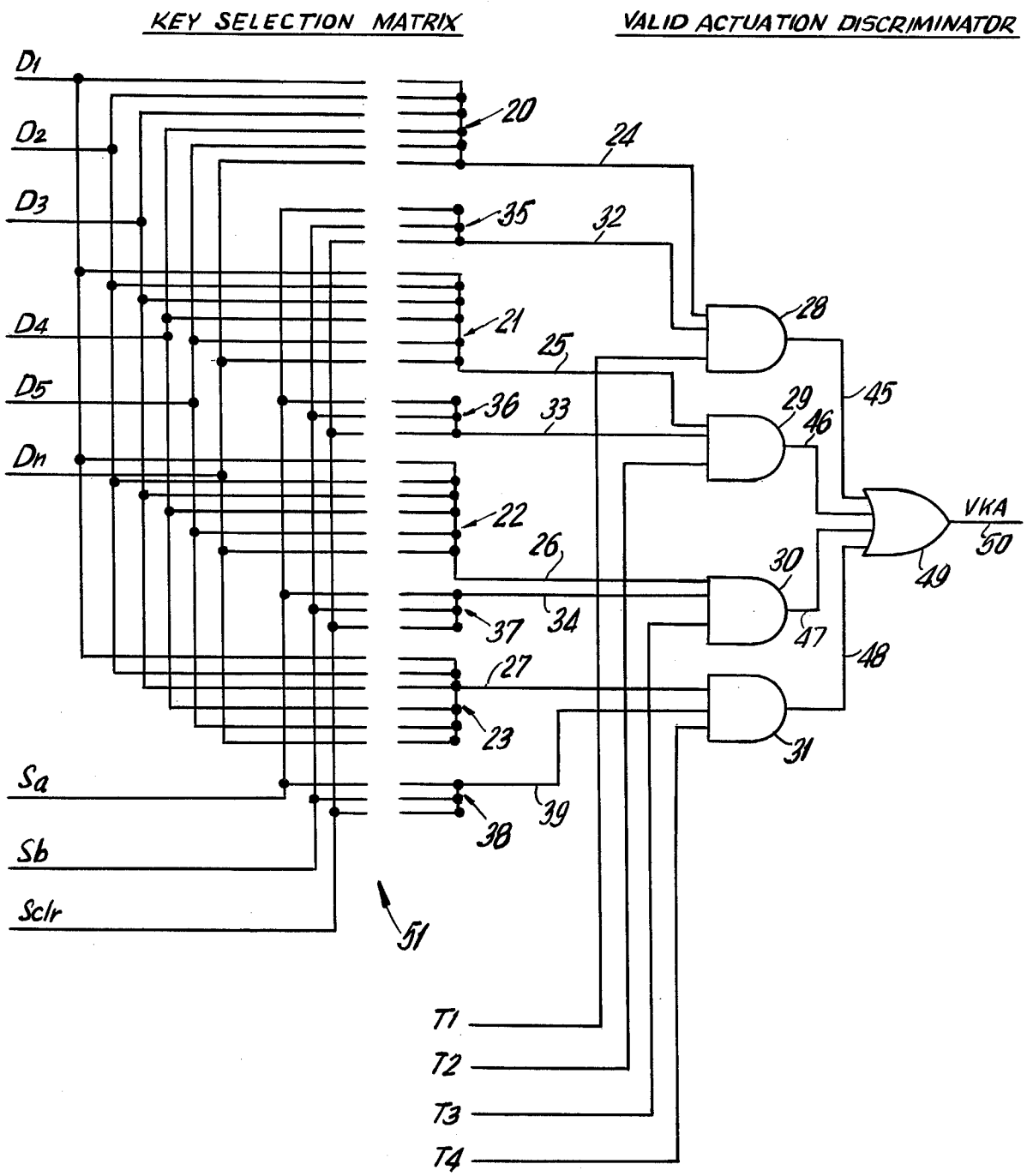
FIG. 3 is a schematic drawing of two subcircuits of the circuit of the present invention and relates to the block labeled "selection matrix and valid actuation discriminator," as shown in FIG. 2.

As shown in FIG. 3, each of the digit drive lines D1 through D$n$ are connected to a selection matrix 51 which is divided into four clusters, each cluster being connected to each digit drive line. Each of the drive lines D1 through D$n$, for example, the six digit drive lines shown in FIG. 3, are connected to each one of the clusters 20, 21, 22 and 23 for a total of 24 lines in the four clusters. Each of these 24 lines in the clusters 20, 21, 22, 23 has a gap which is fillable by a jumper. The jumper selects which of the digit lines will correspond with each sequence position. For example, the first key which is depressed may be selected by the code to be the key No. 4, in which case the digit drive line for the key 4 (D4) will have a jumper, that is, the jumper will connect the digit drive line D4 in cluster 20. As an alternative manufacturing technique, the original selection matrix may be formed with all the jumpers in place and all but one in each cluster may be blown out, i.e., unconnected, during the course of manufacture. In either event, there is only one of the lines connected in each cluster.

The output lines of each of the digit selection matrix clusters, namely, line 24 (from cluster 20), line 25 (from cluster 21), line 26 (from cluster 22) and line 27 (from cluster 23) each is one of the inputs to one of four "and" gates 28, 29, 30 and 31. Each of the "and" gates 28 through 31 has three inputs and a signal must appear simultaneously at each of the three inputs in order for there to be an output at those "and" gates. The second input to each of the "and" gates 28 through 31 are the output lines 32, 33, 34 and 39, which are the output lines from the respective clusters 35, 36, 37 and 38. The clusters 35, 36, 37 and 38 are the selection matrix for the sense lines S$a$, S$b$ and S clr. In the clusters 35, 36, 37 and 38 there are only three lines corresponding to the three sense lines and one jumper is placed in each of the clusters 35, 36, 37 and 38 in order to determine which of the sense lines is connected to the output lines 32, 33, 34 and 39 respectively.

The third input to each of the "and" gates 28 through 31 is from the sequence timer and is designated as lines T1, T2, T3 and T4. To provide an output, for example, from the "and" gate 28, which corresponds to the first key depressed, there must simultaneously occur (i) an input pulse to the "and" gate 28 from the selected digit drive line, which is determined by the jumper in the cluster 20, and (ii) an input pulse to the "and" gate 28 which is determined by the sense line selected by the jumper in cluster 35, and (iii) an input pulse to the "and" gate 28 from the sequence timer on line T1. The outputs of the gates 28 through 31, which are the lines 45, 46, 47 and 48 respectively, are connected to a four-input "or" gate 49. The "or" gate 49 produces an output to its output line 50 when any one of the "and" gates 28, 29, 30, 31 are actuated. That is, the "or" gate 49 produces an output to the line 50 whenever a correct key of the code is depressed in its proper order in the sequence.

The embodiment of FIG. 3 is directed to a code having four positions. For example, the code may be the digit keys 6, 8, "and" and 1. It should be realized, however, that the code may be lengthened or shortened by using either fewer or more clusters and fewer or more time sequence input lines. For example, if it is desired that there will be a six-number code, there would be six time sequence input lines and correspondingly six clusters of the digit selection matrix, assuming that each key of the code was different from the other keys. There are a number of provisions which may be utilized to decrease the size of the selection matrix 51. For example, it may be selected that all of the keys of the code are taken from a single sense line, for example, line S$a$. In that event the sense line clusters may be omitted and the single sense line S$a$ may be directly connected to the lines 3, 33 and 34. As another alternative to reduce the size of the selection matrix is to pretend that the number of elements of the code is greater than it actually is. This can be accomplished, for example, using the circuitry of FIG. 3, which is actually a four-digit code, and pretending and telling the customers that it is a five-digit code. For this purpose an additional sequence line T5 is placed in order, for example, between T2 and T3. The sequence line D5 would also be connected to the "or" gate 42. In this alternative the depression of any key of the keyboard would operate the sequence line T5. The customers would be given a five-digit code. However, one of those digits may be operated by any key of the keyboard. Still another alternative to reduce the size of the selection matrix is to repeat a key; for example, the code may be "8668" in which two keys are repeated. In this case the same clusters may be used twice. If both "8" and "6" are on the same sense line one would need only two digit drive line clusters for the selection matrix and the four time sequence lines T1, T2, T3 and T4.

Figure 2:
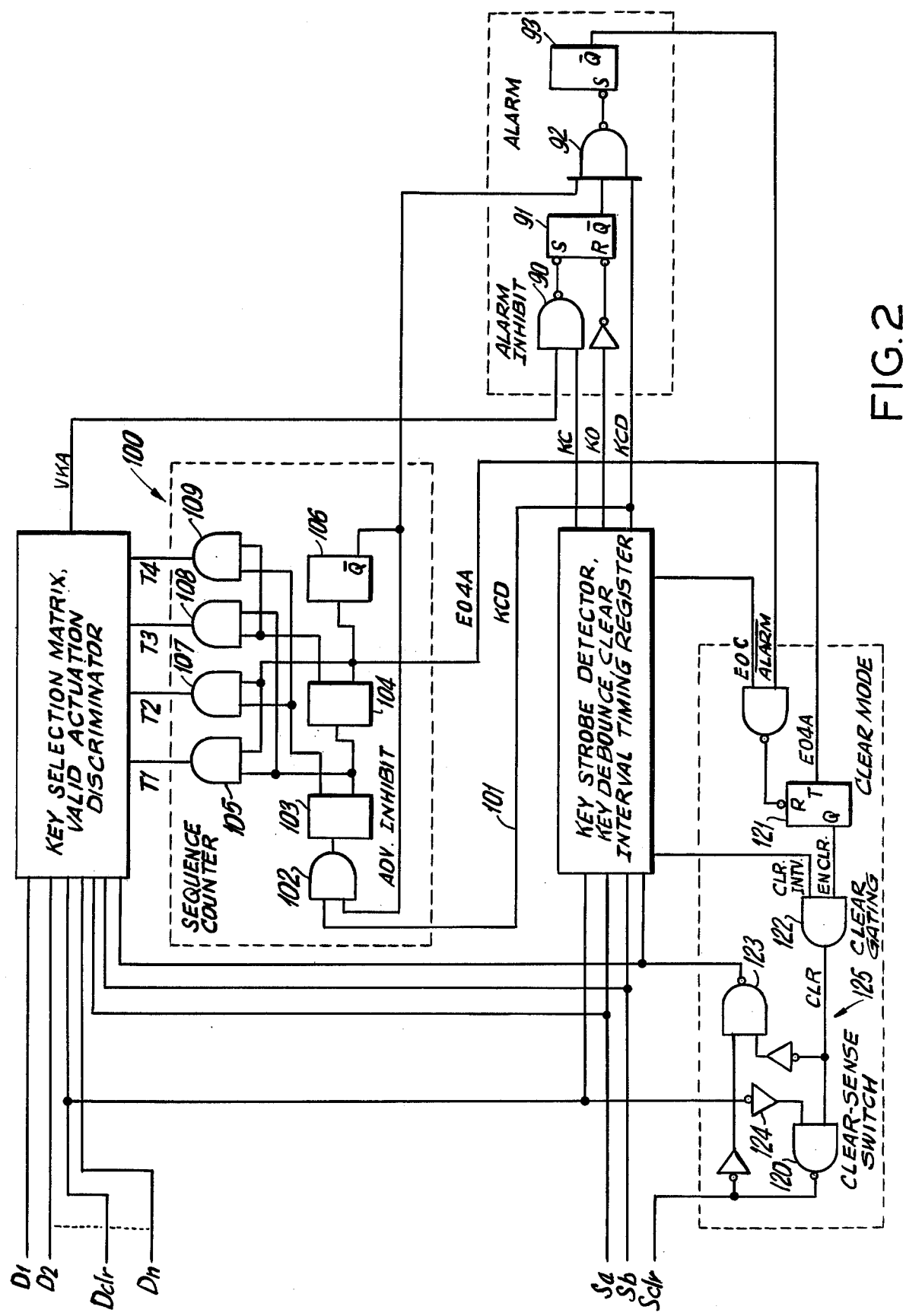
FIG. 2 is a partial circuit and partial block diagram of the circuit of the device of the present invention.

The sequence counter 100, shown in FIG. 2, serves to determine the current key actuation required, in combination with the selection matrix 51. Upon application of power to the apparatus the sequence counter 100 is cleared and initialized to the first state (T1). Upon each key closure, the counter is incremented by a signal which occurs with a delay after key closure, by the signal KCD which is on line 101 to "and" gate 102. The sequence counter has as many states as the number of key closures required in the code (four, in the example of the present embodiment). The "and" gates 105, 107, 108 and 109 are connected to the sequence counter flip-flops 103 and 104 so as to decode the four states of the sequence counter. A sequence of four key closures are required to produce the sequence of four signals, one signal in sequence on lines T1, T2, T3 and T4. The key may be any keys to produce a signal on lines T1-T4. Having completed the required number of key closures, flip-flop 106 is set which disables "and" gate 102, preventing any further advances of the sequence counter.

Figure 4:
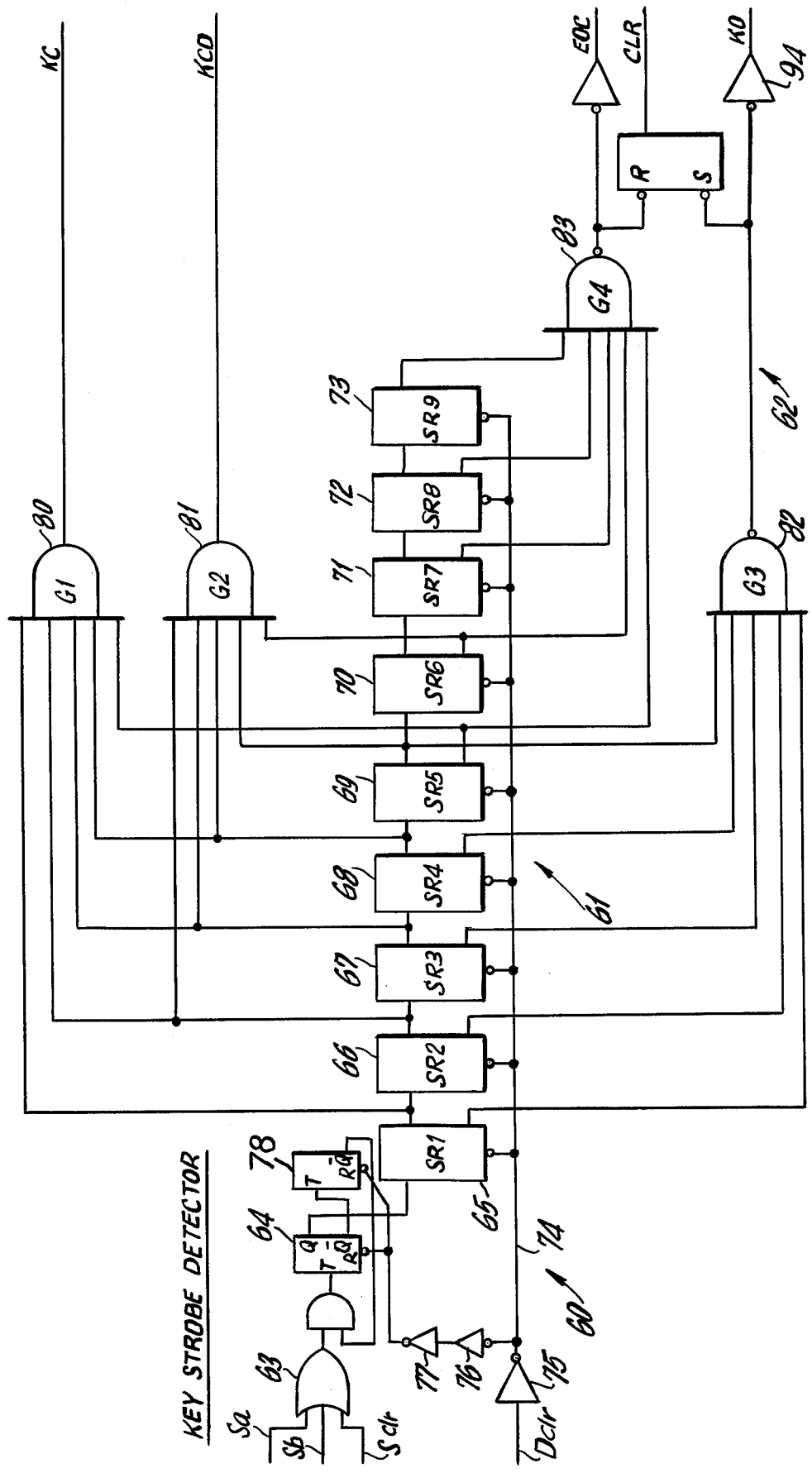
FIG. 4 is a schematic drawing of a subcircuit of the device of the present invention and relates to the block labeled "key strobe detector, key debounce and clear interval" in FIG. 2.

The key-strobe detector 60, key debounce 61, and clear interval timing register 62 sections are shown in FIG. 4. The key strobe detector "or" gate 63 is connected to the column sense lines S$a$, S$b$ and S clr. Any logic level changes at the output of this "or" gate 63 can come only from a key closure. Such a level change, which would be time coincident with one of the row-scan pulses, causes the key strobe detector flip-flop 64 to latch. The flip-flop 78, which immediately follows flip-flop 64, is used to prevent an unauthorized person from depressing more than one key in an attempt to break the code. Both flip-flops 64 and 78 are cleared once each scan cycle by the D$_{clr}$ signal through "inverter" gates 75, 76, 77. The row-scan pulse indicated as D$_{clr}$ is one of the digit drive lines which are continuously scanned and therefore receives a pulse train. If more than one key is actuated at a time, then more than one pulse occurs at the output of "or" gate 63 within the digit scan cycle. The first of these pulses causes flip-flop 64 to set; however, the next pulse toggles flip-flop 64 to the reset state, which in turn causes the next flip-flop 78 to set. The set state of this flip-flop 78 disables further inputs to flip-flop 64, so that for any cycle with more than one key closure flip-flop 64 will appear not to have been activated at all.

The key debounce circuitry is required to eliminate erroneous signals due to the incomplete closure or opening of a key switch, which is frequently encountered as the key is actuated. Generally a delay period of 2 milliseconds is allowed for key debounce discrimination. In the embodiment shown in FIG. 4, a shift register, consisting of flip-flop circuits 65–73, is employed as (i) a means of storing the information about the state of the key strobe detector by providing a delay for key bounce discrimination, and also (ii) as a simple means of providing time intervals for the remainder of the device.

The $D_{clr}$ is used (i) to reset the key strobe detector flip-flop and (ii) to clock the shift register on line 74 through inverter 75. Sufficient delays by delays 76, 77 are inserted before the flip-flop 64 to assure that its output will be stable until after its contents have been strobed into the shift register 61. The shift and clear operation are synchronized to the falling edge of the $D_{clr}$ pulse.

If the keyboard has not been operated for some time, then all bits of the shift register 61 will be in the zero state. This is because nothing has occurred to set the detector flip-flop 64. It has been in the zero state and its contents have been strobed into the shift register 61 on each $D_{clr}$ pulse (which occurs roughly once per millisecond). The zero state advances through the shift register 61 on every shift pulse. The scan through all the digits takes about 1 millisecond. Upon actuation of any key, the detector flip-flop 64 latches and on the trailing edge of the first $D_{clr}$ pulse which follows that latching a ONE is entered into the first bit (flip-flop - SR1) of the shift register 64. If the key remains actuated for 3 milliseconds following the first $D_{clr}$ pulse, then there will be ONEs in flip-flops 65 (SR1) through 68 (SR4) and there will be a ZERO in flip-flop 69 (SR5). This condition is detected as a key closure (KC) by "and" gate 80. The output of "and" gate 80 goes high for a period of 1 millisecond, 3 milliseconds after a complete key closure. Similarly the output of "and" gate 81 goes high for a period of 1 millisecond, 4 milliseconds after key closure. Its output is designated key closure delayed (KCD). And the output of "and" gate 82 goes high for 1 millisecond, 3 milliseconds after a complete key opening (KO) when flip-flops 65–68 are ZERO and flip-flop 69 is ONE. The output of "and" gate 83 goes high for 1 millisecond, 7 milliseconds after a complete key opening (EOC); this has been designated End of Clear. The interval from the beginning of complete key opening (KO) to the beginning of 7 milliseconds later EOC is called the "clear interval" (CI).

The alarm circuitry is shown in FIG. 2. The alarm would be set by any improper key actuation, but a proper key operation inhibits the setting of the alarm. At the end of the required number of proper key closures, determined by the preselected code, the alarm is prevented from being set by further key actuations. A key closure (KC) signal combined with a signal from validity discriminator (VKA) to the "and" gate 90 causes the alarm inhibit flip-flop 91 to set. The inhibit flip-flop 91 is connected to "and" gate 92 whose other input is KCD (delayed key closure gate 81). When inhibit flip-flop 91 is set, it prevents the delayed key closure signal (KCD) from setting the alarm flip-flop 93. The inhibit flip-flop 91 is reset at the key open (KO) signal from "and" gate 82 through inverter 94. In the event of a key closure signal KC which is not accompanied by a signal from the valid actuation VKA, the inhibit flip-flop 91 is not set and the KCD signal sets the alarm flip-flop 93.

The clear sense switch and its gating and mode controls is shown in FIG. 2. The $S_{clr}$ column sense line is the sense line which is connected by the CLEAR key to the $D_{clr}$ row-scan pulse, that is, a train of such pulses is placed on $S_{clr}$ line upon closure of the CLEAR key. The alarm is a pseudo-key actuation of the CLEAR operation. This is accomplished when the $D_{clr}$ pulses are fed onto the $S_{clr}$ line through "AND" gate 120. The output of "AND" gate 120 must appear as an "open drain" when not active, so as to avoid disturbing the normal operation of the $S_{clr}$ line. The clear mode flip-flop 121 is set at the end of the fourth actuation by a signal on line E04A from the sequence counter 100. This enables a clear operation (EN CLR line) to begin, which happens when the clear interval (CLR INTV) of the clear timing section goes high, both lines EN CLR and CLR INTV being inputs to "and" gate 122 whose outputs are to the inputs of "and" gates 120 and 123. The output of the clear gating (CLR) gate 122 thus turns on gate 120 which has as its other input the $D_{clr}$ signal (inverted by inverter 124). The CLR signal had simultaneously disabled the input to the strobe detector by turning off gate 123. At the end of the clear interval the clear pseudo-actuation stops. Also, the clear mode flip-flop 121 is reset unless the alarm flip-flop 93 has been set. If the alarm flip-flop 93 has been set, then each time that a key is actuated it is followed by a pseudo-actuation clear operation injected by the clear-sense switch 125 of the device. The pseudo-actuation is set up to inject clear signals in this embodiment. Alternatively, other keys may be mimicked, for example, the number 1 may be repetitively displayed as the alarm.

It is thus seen that following actuation of the power switch of the instrument, the operator is required to enter a predetermined sequence of key actuations. His failure to do so results in setting an "alarm" within the instrument. This alarm causes improper operation of the apparatus by automatically entering "pseudo-key" actuations to the apparatus' keyboard encoding circuitry. These pseudo-key actuations duplicate the effect of a key closure, though completely under control of the device of the present invention. It is a simulation of the normal function of the instrument and therefore completely non-detrimental to the physical integrity of the instrument's circuitry. The pseudo-key actuations are totally disruptive to proper operation of the apparatus. The only means of shutting off the alarm is to remove power from the apparatus via the power switch because of the "alarm reset mode." Reapplication of power brings the device on in "sequence detect mode." If the proper sequence is then entered, the device acts to lock itself in the "quiescent mode" and will no longer have an effect upon operation of the apparatus. In the implementation of calculator or computer locks, at the end of the proper code sequence, the device of the present invention may clear the registers of the apparatus (as an operating convenience).

The device does not alert an unauthorized user of a code error until the entire sequence of code is entered, i.e., at the end of the code length. Consequently, an unauthorized user cannot, by trial and error, learn the correct unlocking code.

To effectively deter theft of portable apparatus equipped with the device of the present invention, a clearly visible label or other marking should caution against attempted use by unauthorized persons, indicating that the apparatus is protected by an electronic combination lock. As a further precaution (not shown)

it should be possible to route some of the apparatus' own signal paths through the device in such a manner that any attempt to disable or remove the device from the apparatus would result in the complete disabling of the apparatus.

In the case where the instrument to be protected is an electric typewriter the "alarm" may produce a pulse train which will either (i) activate the keys to produce a nonsense series of letters and numbers, or (ii) activate the "debounce" circuit and inhibit it so that nothing will be typed and the typewriter will not respond to key movements.

I claim:

1. A security device for a keyboard electronic instrument, in which instrument the keyboard has a plurality of cross-points and a plurality of sense lines and a plurality of digit lines connected thereto, said instrument having scanning means to interrogate the cross-points of said keyboard, the security device being connected to at least some of the digit lines and all of the sense lines, said device including a selection matrix connected to a plurality of the said sense lines and a plurality of the said digit lines, valid actuation discriminator means connected to said selection matrix, a sequence counter means connected to said valid actuation discriminator means to provide a sequence of pulses provided by the sequencing of the keys of said keyboard, and alarm means actuated unless inhibited by said validity means, said alarm means producing a pulse train to cause malfunction of said instrument.

2. A security device as in claim 1 wherein said selection matrix includes a matrix of connectors in which only a few of the possible connections are connected to provide a preselected output, those few connections corresponding to keys selected to be the unlocking keys of the instrument.

3. A security device as in claim 1 wherein said selection matrix is connected to all of said sense lines.

4. A security device as in claim 1 wherein said valid actuation discriminator means includes a plurality of "and" gates, each of said "and" gates being connected to one of said few connections and to one output of said sequence counter.

5. An instrument as in claim 1 and including a calculator chip having bit storage registers wherein said alarm means is connected to clear said registers.

6. A security device as in claim 1 and further including a shift register connected to at least one of said sense lines to provide a check that the key has been closed for a pre-selected time period.

7. A security device as in claim 6 and further including means to prevent multiple key entry.

8. A security device as in claim 1 wherein said keyboard electronic instrument is a solid-state electronic calculator and said pulse train causes the malfunction which is a useless display of numbers resulting from pseudo-key actuations duplicating the effect of key closures.

* * * * *